US008645696B2

(12) United States Patent
Schneider

(10) Patent No.: US 8,645,696 B2
(45) Date of Patent: Feb. 4, 2014

(54) NOTIFYING USERS OF SERVER CHANGES VIA SSL

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1470 days.

(21) Appl. No.: 12/324,747

(22) Filed: Nov. 26, 2008

(65) Prior Publication Data

US 2010/0131766 A1 May 27, 2010

(51) Int. Cl.
H04L 29/06 (2006.01)
H04L 9/32 (2006.01)
(52) U.S. Cl.
USPC .......................... 713/175; 713/156; 713/157

(58) Field of Classification Search
USPC .......................... 713/175, 156, 157
See application file for complete search history.

(56) References Cited

U.S. PATENT DOCUMENTS

| 2003/0126131 | A1* | 7/2003 | Cihula et al. ....................... 707/9 |
| 2004/0093419 | A1* | 5/2004 | Weihl et al. ....................... 709/229 |
| 2005/0081025 | A1* | 4/2005 | Thornton et al. ............... 713/155 |

* cited by examiner

Primary Examiner — Linglan Edwards
Assistant Examiner — Lawrence Cosby
(74) Attorney, Agent, or Firm — Lowenstein Sandler LLP

(57) ABSTRACT

An apparatus and a method for authenticating a secure communication is described. A server receives a request from a client for an original SSL certificate. The server embeds a message in a common name (CN) of a new SSL certificate directing the client to another server. The client is transparently reconfigured and establishes a secure communication with the other server using the new SSL certificate.

17 Claims, 5 Drawing Sheets

NOTIFYING USERS OF SERVER CHANGES VIA SSL

TECHNICAL FIELD

Embodiments of the present invention relate to computing systems, and more particularly, to a secured communication with a server.

BACKGROUND

The Secure Sockets Layer (SSL) protocol allows applications to communicate across a network in a way designed to prevent eavesdropping, tampering, and message forgery. SSL provides endpoint authentication and communications privacy over the Internet using cryptography.

However, SSL-enabled clients typically match the CN ("common name") element of the subject name of the server's SSL certificate against the requested server name, and report any mismatch to the user. For example, visiting a server under development causes two error dialogs to occur—one because the certificate is self-signed, and one because the browser is expecting one name, but is getting a certificate with a different name. The second error dialog displays both the expected and the received server names.

Another problem is that the authentication of the CN element of the subject name is a convention, and it is not required by the SSL standard. There is no structural requirement on the CN element that dictates that it holds a server name. In fact, for personal SSL certificates (such as the ones used to sign email), the CN field typically contains the owner's legal name. It can hold any printable string of just about any length.

As such, when migrating services to a new server, it is not unusual to use a new server name. Indeed, it may be required, if both servers are to be operational for some overlapping period of time. When the old server is no longer to be used, it cannot ordinarily just be shut off because its old users may have configuration that depends on the old name (browser bookmarks, email account server settings, etc).

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for authenticating a secure communication. An apparatus and a method for authenticating a secure communication is described. A server receives a request from a client for an original SSL certificate. The server embeds a message in a common name (CN) of a new SSL certificate directing the client to another server. The client is transparently reconfigured and establishes a secure communication with the other server using the new SSL certificate.

Figure 1:
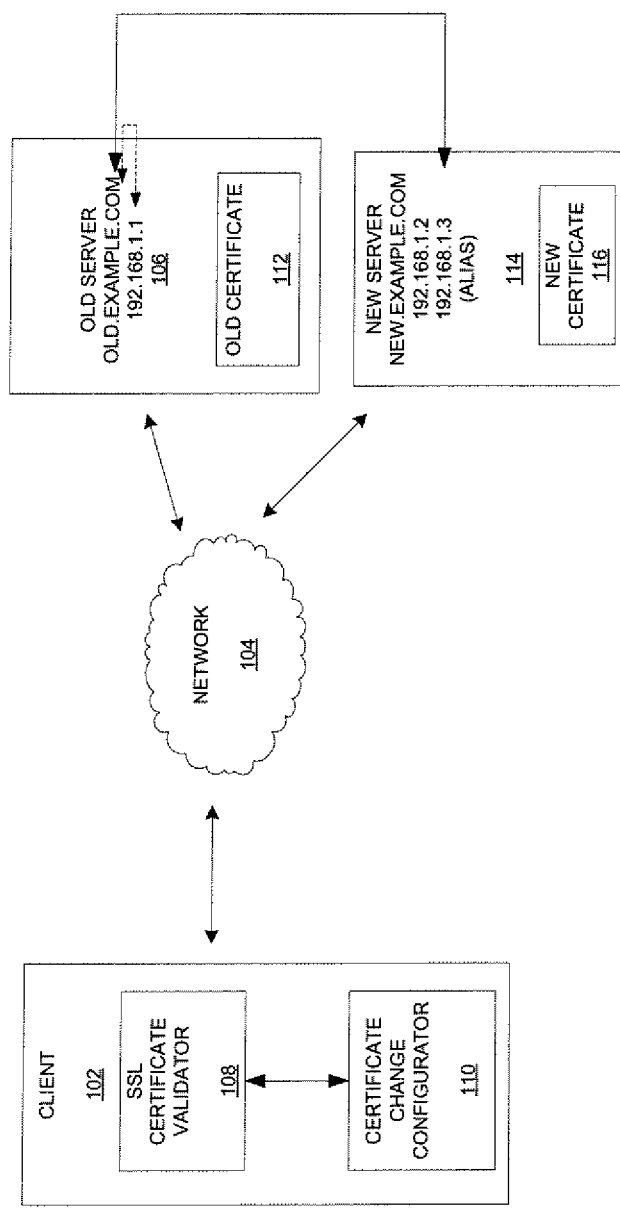
FIG. 1 is a block diagram illustrating one embodiment of a system for authenticating a communication with a server.

FIG. 1 is a block diagram illustrating one embodiment of a system for authenticating a communication with a server. The system includes a client 102 that communicates and authenticates with a server 106. Client 102 can be any type of computer device including a desktop computer, laptop computer, handheld computer, console device or similar computing device. Similarly, servers 106 and 114 can be any type of computer device including a desktop computer, laptop computer, handheld computer, console device or similar computing device. Client 102 and servers 106, 114 can communicate over a network 104. Network 104 can be a wide area network (WAN), such as the Internet, a local area network (LAN) or similar network. Network 104 can include any number of computers and network devices. Network 104 can include any combination of wired and wireless communication lines and devices.

In one embodiment, client 102 includes an SSL certificate validator 108 and a certificate change configurator 110. Certificate validator 108 is configured to request and receive a certificate from a server that client 102 wishes to establish a secure communication with. Upon receiving the certificate from the server, SSL certificate validator 108 determines whether the certificate is valid. In one embodiment, SSL certificate validator 108 compares the common name (CN) element of the name of the server's SSL certificate against the requested server name. The CN element is the CN element of the certificate's subject name. In one embodiment, if there is a mismatch, it is reported to the user. In another embodiment, if there is a mismatch, SSL certificate validator 108 communicates that information to certificate change configurator 110.

In one embodiment, certificate change configurator 110 automatically and transparently reconfigures the SSL configuration settings of client 102 to allow client 102 to securely communicate with the server having a mismatch CN SSL certificate. This reconfiguration may be transparent to the user.

FIG. 1 illustrates a example of a system where an old server 106 is being retired or replaced with a new server 114. Old server 106 includes a new SSL certificate 112. New server 114 includes new SSL certificate 112.

First, a message is embedded in the CN of the certificate for a to-be-decommissioned server, old server 106, that has a message directing the user to the new server 114. In particular, it cannot just be the new server name; most user will refuse to go to the new site, and the rest will just assume it is a server configuration error and tell their agent software (browser, email client, etc) to ignore the error and continue. It needs to be something that a user can reasonably understand to mean they need to be using a new server. So, the CN would become something like "mail.acme.com is no longer in service—please use acmemail.outsourcedemail.com".

To be trusted, this new certificate would have to be signed in a manner that the client can validate (otherwise, an attacker could spoof a certificate directing an unsuspecting user to a hostile site). An easy way to do this (assuming the original server certificate was still valid) would be to sign the new certificate with the key corresponding to the original certificate—this may cause an additional error message on some user agents, if the original certificate doesn't possess the CA ("Is a Certificate Authority") attribute.

Second, user agents can be extended to use the information presented in the CN to transparently reconfigure themselves. It would have to match the expected pattern, and the certificate would have to be signed by a certificate that the user agent could otherwise validate, but assuming both of these are true, it would be safe for the user agent to update its configuration.

Both parts are critical here—the first part lets users with old user agents know that something is wrong, and give them a hint about what to do about it, and the second part doesn't directly involve the user at all (assuming they have the new user agent software), but allows old and new user agents to coexist.

To ensure that the message is frequently shown to users who may accept the certificate as valid forever, a new certificate (with a new serial number) can be generated and deployed as often as necessary (daily or once an hour).

If the service requires authentication that identifies a particular user, it would also be possible to identify users who need to switch server names, and provide any assistance they may need to make the switch. For example, the CN would become something like "mail.acme.com is no longer in service—please use acmemail.outsourcedemail.com".

Figure 2:
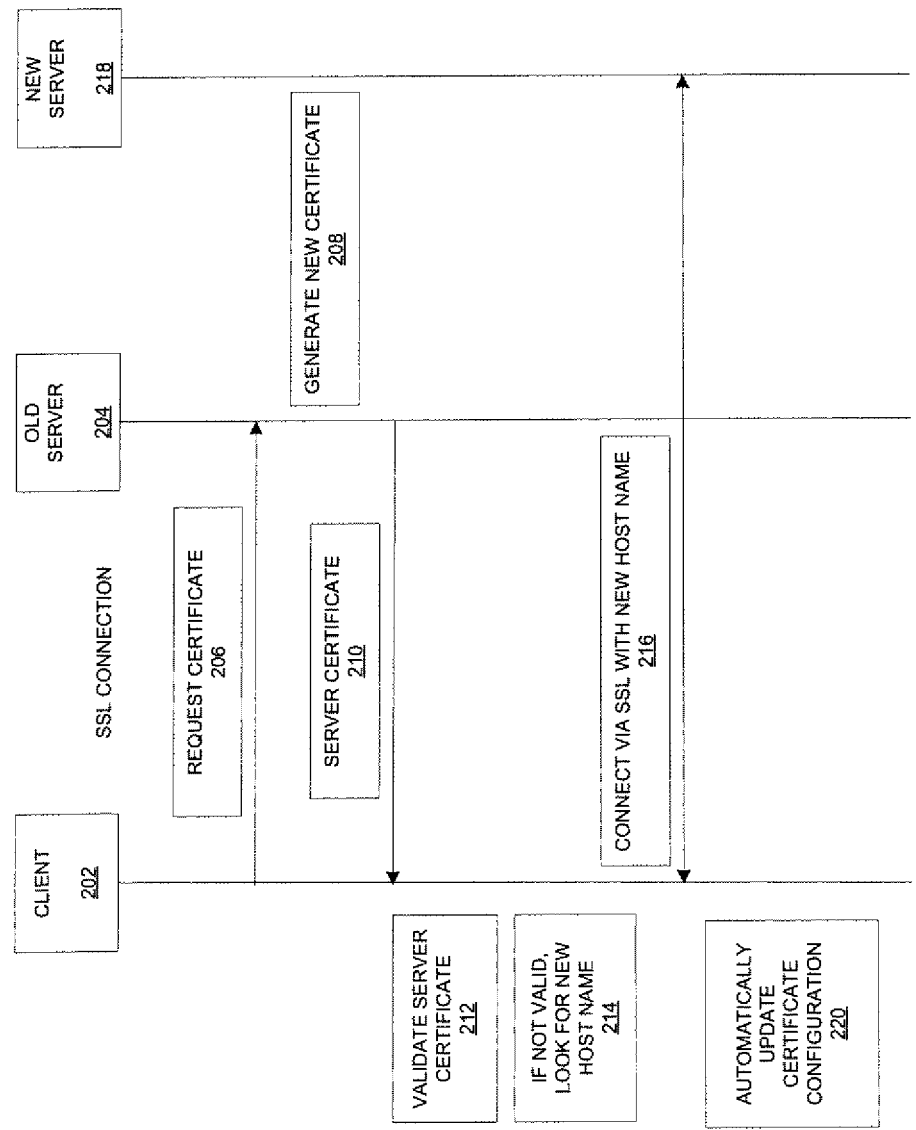
FIG. 2 is a ladder diagram illustrating one embodiment of a method for authenticating a communication with a server.

FIG. 2 is a ladder diagram illustrating one embodiment of a method for authenticating a communication with a server. A client 202 attempts to establish a secure communication with old server 204. Client 202 requests a certificate 206 from old server 204. Old server 204 generates a new certificate with new server 218's common name at 208. Old server 204 returns the new certificate 210 to client 202. Client 202 validates the new certificate at 212 and looks for a message in the CN of the new certificate at 214. Client 202 then looks for a new host name and connects at 216 with the new host, new server 218 which certificate's common name matches the new server's name. At 220, client automatically and transparent to the user, updates its certificate configuration at 220 with the new settings of new server 218.

Figure 3:
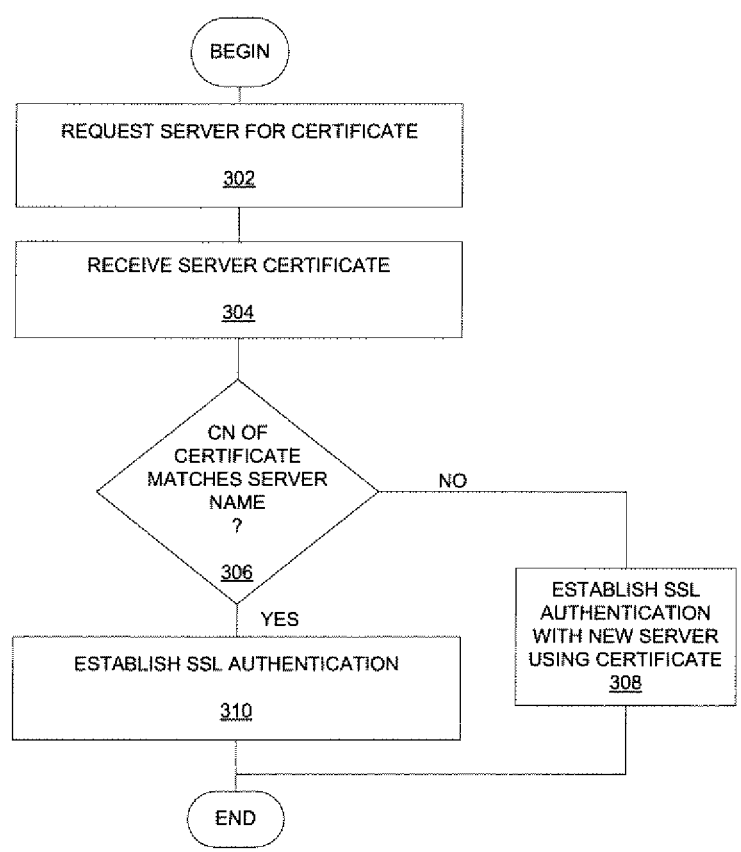
FIG. 3 is a flow diagram illustrating one embodiment of a method for establishing a secure communication with a server.

FIG. 3 is a flow diagram illustrating one embodiment of a method for establishing a secure communication with a server. At 302, a client requests for a SSL server certificate. At 304, client receives SSL server certificate 304. At 306, client determines whether the CN of the certificate matches the server name. If it does at 310, client establishes an SSL authenticated communication with the server. If the CN of the received certificate does not match the CN of the server, client reads the message in the CN at 308, and uses that information to automatically and transparent to the user reconfigures its settings at 310. Client finally establishes a secure communication with a new server.

Figure 4:
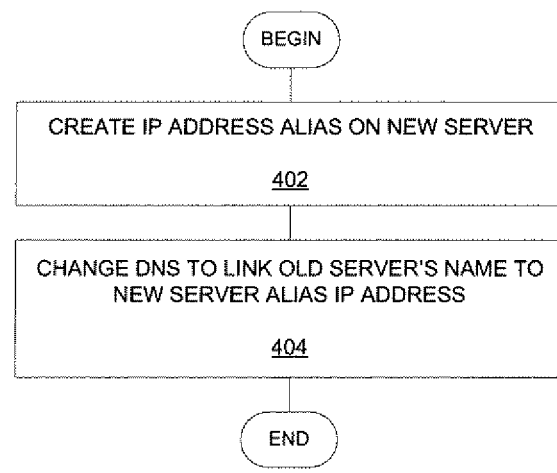
FIG. 4 is a flow diagram illustrating one embodiment of a method for transparently reconfiguring a secure communication with a server.

FIG. 4 is a flow diagram illustrating one embodiment of a method for transparently reconfiguring a secure communication with a new server. At 402, a message is embedded in the CN of a new SSL certificate. The message directs the user to another server. The new certificate is signed with the key of the original certificate at 404 to guarantee its authenticity. At 404, user agents transparent to the user reconfigure the settings.

Figure 5:
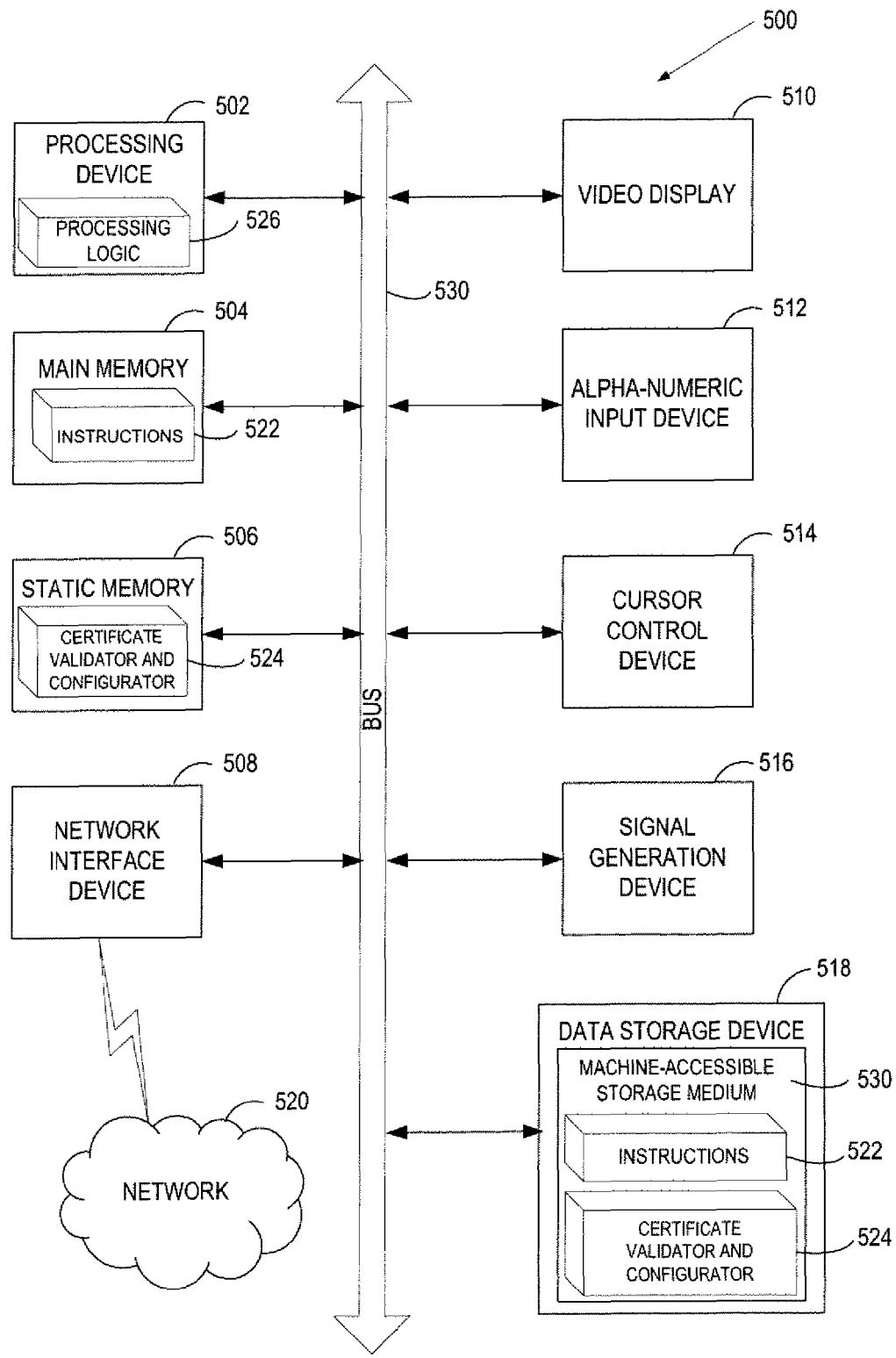
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute modules 526 (previously described with respect to FIG. 1) for performing the operations and steps discussed herein with. In one embodiment, the modules may be include hardware or software or a combination of both.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting computer-accessible storage media. The software 522 may further be transmitted or received over a network 520 via the network interface device 508.

The computer-accessible storage medium 530 may also be used to store the certificate validator and reconfigurator module 524 as presently described. The certificate validator and reconfigurator module 524 may also be stored in other sections of computer system 500, such as static memory 506.

While the computer-accessible storage medium 530 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request from a client for an original SSL certificate at a first server, the request comprising a requested server name;
generating an alias IP address for the first server;
comparing a common name (CN) element of the original SSL certificate at the first server against the requested server name;
notifying a user associated with the client of a mismatch between the CN element and the requested server name when a mismatch occurs;
modifying a system server to resolve the mismatch between the alias IP address and the CN of a different server;
embedding a message in the CN element of a new SSL certificate directing the client to the different server;
sending the new SSL certificate to the client; and
establishing a secure communication between the client and the different server using the new SSL certificate.

2. The method of claim 1 wherein the CN of the original SSL certificate does not match a domain name of the first server.

3. The method of claim 1 further comprising:
signing the new SSL certificate with a key corresponding to the original SSL certificate.

4. The method of claim 1 further comprising:
validating the new SSL certificate at the client.

5. The method of claim 4 further comprising:
transparently reconfiguring the client to communicate with the different server upon successful validation.

6. The method of claim 1 further comprising:
receiving the request for the new SSL certificate on the alias IP address; and
generating the new SSL certificate with the CN of the different server.

7. A non-transitory computer-readable storage medium, having instructions stored therein, which when executed, cause a computer system to execute operations comprising:
receiving a request from a client for an original SSL certificate at a first server, the request comprising a requested server name;
generating an alias IP address for the first server;
comparing a common name (CN) element of the original SSL certificate at the first server against the requested server name;
notifying a user associated with the client of a mismatch between the CN element and the requested server name when a mismatch occurs;
modifying a system server to resolve the mismatch between the alias IP address and the CN of a different server;
embedding a message in the CN element of a new SSL certificate directing the client to the different server;
sending the new SSL certificate to the client; and
establishing a secure communication between the client and the different server using the new SSL certificate.

8. The non-transitory computer-readable storage medium of claim 7 wherein the CN of the original SSL certificate does not match a domain name of the first server.

9. The non-transitory computer-readable storage medium of claim 7 wherein the operations further comprises:

signing the new SSL certificate with a key corresponding to the original SSL certificate.

10. The non-transitory computer-readable storage medium of claim 7 wherein the operations further comprises:
    validating the new SSL certificate at the client.

11. The non-transitory computer-readable storage medium of claim 10 wherein the operations further comprises:
    transparently reconfiguring the client to communicate with the different server upon successful validation.

12. The non-transitory computer-readable storage medium of claim 7 wherein the operations further comprises:
    receiving the request for the new SSL certificate on the alias IP address; and
    generating the new SSL certificate with the CN of the different server.

13. A system comprising:
    a client to request an original SSL certificate from a first server, the request comprising a requested server name;
    the first server coupled to the client,
    the first server to:
    generate an alias IP address for the first server;
    compare a common name (CN) element of the original SSL certificate at the first server against the requested server name,
    notify a user associated with the client of a mismatch between the CN element and the requested server name when a mismatch occurs,
    modify a system server to resolve the mismatch between the alias IP address and the CN of a different server;
    embed a message in the CN element of a new SSL certificate directing the client to the different server, and
    send the new SSL certificate to the client,
    wherein the client establishes a secure communication with the different server using the new SSL certificate.

14. The system of claim 13 wherein the CN of the original SSL certificate does not match a domain name of the first server.

15. The system of claim 13, the first server to sign the new SSL certificate with a key corresponding to the original SSL certificate.

16. The system of claim 13 wherein the client further comprises:
    a certificate validator to validate the new SSL certificate; and
    a reconfigurator coupled to the certificate validator, the reconfigurator to transparently reconfigure the client to enable secure communication with the different server.

17. The system of claim 13, the first server to:
    receive the request for the new SSL certificate on the alias IP address, and
    generate the new SSL certificate with the CN of the different server.

* * * * *